(12) United States Patent
Ida et al.

(10) Patent No.: US 9,540,483 B2
(45) Date of Patent: Jan. 10, 2017

(54) RESIN FOR TONER AND TONER

(71) Applicant: CANON KABUSHIKI KAISHA, Tokyo (JP)

(72) Inventors: Hayato Ida, Yokohama (JP); Takashi Hirasa, Yokohama (JP); Junichi Tamura, Inagi (JP); Yuya Chimoto, Kawasaki (JP); Takaho Shibata, Tokyo (JP); Daisuke Yamashita, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/768,295

(22) PCT Filed: Apr. 8, 2014

(86) PCT No.: PCT/JP2014/060559
§ 371 (c)(1),
(2) Date: Aug. 17, 2015

(87) PCT Pub. No.: WO2014/168251
PCT Pub. Date: Oct. 16, 2014

(65) Prior Publication Data
US 2016/0002396 A1    Jan. 7, 2016

(30) Foreign Application Priority Data
Apr. 9, 2013 (JP) ................. 2013-081253

(51) Int. Cl.
*C08G 63/02* (2006.01)
*C08G 63/183* (2006.01)
*G03G 9/08* (2006.01)
*G03G 9/087* (2006.01)
*C08G 63/16* (2006.01)

(52) U.S. Cl.
CPC ........... *C08G 63/183* (2013.01); *C08G 63/16* (2013.01); *G03G 9/0804* (2013.01); *G03G 9/0806* (2013.01); *G03G 9/08755* (2013.01); *G03G 9/08795* (2013.01); *G03G 9/08797* (2013.01)

(58) Field of Classification Search
CPC ....................................... C08G 63/16
USPC ..................... 528/271, 272, 308.6
See application file for complete search history.

(56) References Cited

U.S. PATENT DOCUMENTS

| | | | |
|---|---|---|---|
| 3,853,778 A | 12/1974 | Buckley et al. |
| 4,381,379 A | 4/1983 | Toga et al. |
| 7,390,605 B2 | 6/2008 | Shirai |
| 7,833,687 B2 | 11/2010 | Kato et al. |
| 8,697,327 B2 | 4/2014 | Shibata et al. |
| 9,057,970 B2 | 6/2015 | Ida et al. |
| 9,348,247 B2 | 5/2016 | Ida et al. |
| 2013/0108955 A1 | 5/2013 | Shibata et al. |
| 2013/0202998 A1 | 8/2013 | Higashi et al. |
| 2015/0099227 A1 | 4/2015 | Ida et al. |
| 2015/0362853 A1 | 12/2015 | Ida et al. |

FOREIGN PATENT DOCUMENTS

| | | |
|---|---|---|
| CN | 1814646 | 8/2006 |
| EP | 2 985 303 | 2/2016 |
| JP | 56-13943 B2 | 4/1981 |
| JP | 57-158222 A | 9/1982 |
| JP | 62-39428 B2 | 8/1987 |
| JP | 4-120554 A | 4/1992 |
| JP | 4-120555 A | 4/1992 |
| JP | 4-239021 A | 8/1992 |
| JP | 8-36274 A | 2/1996 |
| JP | 2005-300867 A | 10/2005 |
| JP | 2005-350508 | 12/2005 |
| JP | 2012-118466 | 6/2012 |
| JP | 2012-233037 A | 11/2012 |
| WO | 2006/095901 | 9/2006 |
| WO | 2014/168131 | 10/2014 |

OTHER PUBLICATIONS

International Search Report and Written Opinion of the International Searching Authority, International Application No. PCT/JP2014/060559, Mailing Date Jun. 17, 2014.
International Preliminary Report on Patentability, International Application No. PCT/JP2014/060559, Mailing Date Oct. 22, 2015.
Communication/Supplementary European Search Report dated Nov. 22, 2016.
Bello, et al., Conformational Characteristics and Crystalline Order in poly(2-methyl-1,3-propane glycol terephthalate), Macromolecules, vol. 32, No. 24 (Nov. 1, 1999) XP55318452, pp. 8197-8203.
"Database WPI, Week 200666, Thomson Scientific, London, GB, AN 2006-635871" XP2764117 (2006).

*Primary Examiner* — Terressa Boykin
(74) *Attorney, Agent, or Firm* — Fitzpatrick, Cella, Harper & Scinto

(57) ABSTRACT

The present invention provides a crystalline polyester resin which has sharp melt property, can achieve both fixing performance and blocking property and has excellent development durability, in which the crystalline polyester resin for toner which has a Young's modulus as measured by an ultramicro durometer at 25° C. of at least 2 GPa and a melting point of at least 60° C. and not more than 125° C.

19 Claims, No Drawings

RESIN FOR TONER AND TONER

TECHNICAL FIELD

The present invention relates to toner for electrophotographic system image-forming methods and a resin constituting the toner.

BACKGROUND ART

Recently there has been an increased demand for energy saving which is accompanied by employment of measures for decreasing the fixation temperature of toners upon image formation. One of those measures is the use of polyester resins having a low softening temperature in order to further decrease the fixation temperature. However, because of the low softening temperature, toner particles may be melt-adhered to cause blocking during stationary standing thereof such as during storage and transportation.

In order to achieve both blocking resistance and low-temperature fixability, techniques have been proposed in which crystalline polyester resins are used having sharp melt property such that the viscosity is significantly decreased at above the melting point (Patent Literatures 1 to 3).

CITATION LIST

Patent Literature

[PTL 1] Japanese Examined Patent Application Publication No. S56-13943
[PTL 2] Japanese Examined Patent Application Publication No. S62-39428
[PTL 3] Japanese Patent Application Laid-open No. H4-120554

SUMMARY OF INVENTION

Technical Problems

When conventional crystalline polyester resins are used as a binder resin for electrophotographic toner, the resins have been excellent in terms of achieving both fixing performance and blocking property due to sharp melt property of the resin, however they have had disadvantages in terms of development durability. Namely the crystalline polyesters have low mechanical strength and may adhere to inner walls of developing assemblies and to carriers when the polyesters are subjected to mechanical shear in developing assemblies for a prolonged period of time.

Thus it is an object of the present invention to provide a crystalline polyester resin which has sharp melt property, can achieve both fixing performance and blocking property and has excellent development durability as well as to provide toner containing the crystalline polyester resin.

Solution to Problem

The present inventors have studied the development durability of crystalline polyesters and as a result have found that one of the causes for deteriorating the development durability is that the crystalline polyester resins for toner have low glass transition temperature and low Young's modulus at room temperature. The crystalline polyester resins for toner having a low melting point basically is formed from a flexible long-chain alkyl frame and thus it has been difficult to increase the Young's modulus, resulting in impaired development durability.

Meanwhile Patent Literature 3 discloses toner containing a crystalline polyester resin having high glass transition temperature. This resin has, despite high Young's modulus and preferable durability, a high melting point and deteriorated fixing performance.

As a result of exhaustive investigation, the present inventors have found that the above problem can be solved by using a crystalline polyester resin for toner having a melting point of at least 60° C. and not more than 125° C. and a Young's modulus as measured by an ultramicro durometer at 25° C. of at least 2 GPa.

Advantageous Effects of Invention

According to the present invention, a crystalline polyester resin and toner containing the crystalline polyester resin can be provided which resin has sharp melt property, can achieve both fixing performance and blocking property and has excellent development durability.

Further features of the present invention will become apparent from the following description of exemplary embodiments.

DESCRIPTION OF EMBODIMENTS

The crystalline polyester resin for toner (hereinafter also merely referred to as crystalline resin) of the present invention has a Young's modulus as measured by an ultramicro durometer at 25° C. of at least 2 GPa and a melting point of at least 60° C. and not more than 125° C.

Due to the property such that the resin has a Young's modulus as measured by an ultramicro durometer at 25° C. of at least 2 GPa, the resin has an increased mechanical strength under room temperature and has preferable development durability. The Young's modulus is preferably 3 GPa or more because the mechanical strength can be further increased. The upper limit of the Young's modulus is not particularly limited and is preferably, in view of decreasing the fixation temperature, 5 GPa or less.

Conventional crystalline polyesters formed from alkyl diols and alkyl dicarboxylic acids have a Young's modulus as measured by an ultramicro durometer at 25° C. of less than 2 GPa and thus have impaired development durability.

The Young's modulus of the crystalline polyester resin for toner of the present invention is determined on an ultramicro durometer under the following conditions.

Measurement specimen: a flat plate of a resin sample having a thickness of 1 mm
Instrument: an ultramicro durometer ENT1100 (Elionix Inc.)
Indenter: triangular pyramid indenter (edge angle: 115° [standard])
Test mode: loading-unloading test
Maximum load: 100 mgf
Steps: 1000
Step intervals: 10 msec
Measurement temperature: 25° C.

The measurement was carried out under the above conditions and the load was eliminated after reaching to the maximum load of 100 mgf to obtain a load-displacement curve. The resulting load-displacement curve was analyzed on an analytical software attached to the ultramicro durometer ENT1100 (Elionix Inc.) to calculate Young's modulus. The above measurement is repeated for 7 times per resin sample, the maximum and minimum values of Young's modulus are eliminated and an arithmetic average is calculated from the remainders to obtain the Young's modulus of the resin sample.

The Young's modulus of the crystalline resin of the present invention in toner is determined according to the above method after isolation of the crystalline resin component from the resin contained in the toner. The crystalline resin component may be isolated by Soxhlet extraction of toner with an ethyl acetate solvent which gives the crystalline resin component as a residue. Whether the molecular structure of the extracted residue is a crystalline resin can be confirmed by NMR spectroscopy.

The crystalline polyester resin for toner of the present invention has a melting point (Mp) of at least 60° C. and not more than 125° C. and more preferably at least 60° C. and not more than 100° C. The melting point of 125° C. or lower allows fixation at low temperatures. The melting point of 100° C. or lower is preferable because of further improved low-temperature fixability. When the melting point is less than 60° C., however, blocking property may be decreased.

The melting point (Mp) of the crystalline resin can be determined on a differential scanning calorimeter (Mettler Toledo Inc.: DSC822/EK90) according to ASTM D3418-82. Specifically, calorimetric analyses are carried out while heating 0.01 g of sample weighed in an aluminium pan from room temperature to 200° C. with a ramp rate of 10° C./min. The melting point corresponds to the peak temperature of the endothermic peak in the resulting DSC curve.

The melting point (Mp) of the crystalline resin of the present invention in toner can be determined by directly measuring the toner according to the method described above. During the determination, the melting point of wax contained in the toner may be observed in some cases. In order to discriminate between the melting point of the wax and the melting point resulting from the crystalline resin, the wax is extracted from the toner by Soxhlet extraction using a hexane solvent, the isolated wax is subjected to the differential scanning calorimetry according to the method described above and the obtained melting point is compared with the melting point of the toner.

The crystalline polyester resin for toner of the present invention preferably has a glass transition temperature (Tg) of at least 25° C. and not more than 70° C.

The resin having the glass transition temperature of less than 25° C. is in a molten state at room temperature, has extremely low Young's modulus at 25° C. and may tend to have decreased development durability. When the glass transition temperature is higher than 70° C., low-temperature fixability may tend to be decreased. The glass transition temperature is more preferably 40° C. or higher in view of development durability with consideration of an increased temperature in machines. The glass transition temperature is more preferably 60° C. or lower in view of fixing performance.

The glass transition temperature (Tg) of the crystalline resin of the present invention is determined on a differential scanning calorimeter (Mettler Toledo Inc.: DSC822/EK90) according to ASTM D3418-82. Specifically, calorimetric analyses are carried out in the temperature range of −100° C. to 200° C. while heating 0.01 g of sample weighed in an aluminium pan to 200° C. with a rate of 10° C./min, cooling the sample from that temperature to −100° C. with a cooling rate of 10° C./min and heating the sample with a ramp rate of 10° C./min. The glass transition temperature corresponds to an intersection point on the resulting DSC curve of a line extended from the base line on the low temperature side towards the high temperature side and a tangential line drawn so as to obtain the maximal gradient on the step-wise change curve of glass transition.

When two or more points for the glass transition temperature are detected, the lowest point is regarded as the glass transition temperature of the resin of the present invention.

The glass transition temperature (Tg) of the crystalline resin of the present invention in toner is determined according to the method described above after isolation of the crystalline resin component from the resin contained in the toner. The crystalline resin component may be isolated by Soxhlet extraction of toner with an ethyl acetate solvent which gives the crystalline resin component as a residue. Whether the molecular structure of the extracted residue is a crystalline resin can be confirmed by NMR spectroscopy.

The crystalline polyester resin for toner of the present invention preferably has a degree of crystallinity as measured by wide-angle X-ray diffraction and calculated with the equation described hereinbelow of at least 10% and more preferably at least 20%. When the degree of crystallinity is less than 10%, the proportion of the amorphous portion may be increased, thereby tending to decrease the blocking property of toner during storage at high temperatures when the resin is contained in the toner.

The upper limit of the degree of crystallinity is not particularly limited and is preferably 70% or less in view of the efficiency during toner production.

The crystalline property of the crystalline resin of the present invention can be determined according to the degree of crystallinity measured by wide-angle X-ray diffraction and calculated with the equation described hereinbelow. A resin is considered to be a crystalline resin when the resin has the degree of crystallinity of 1% or more.

The degree of crystallinity of the crystalline resin of the present invention can be determined by wide-angle X-ray diffraction under the following conditions.

Instrument for X-ray diffraction: D8 ADVANCE from Bruker AXS
X-ray source: Cu—Kα radiation (wavelength: 0.15418 nm)
Power: 40 kV, 40 mA
Slit system: slits DS, SS=1°, RS=0.2 mm
Measurement range: 2θ=5° to 60°
Step interval: 0.02°
Scanning speed: 1°/min The crystalline resin was ground in a mortar and the wide-angle X-ray diffraction profile was obtained under the above conditions. The resulting wide-angle X-ray diffraction profile is divided into crystalline peaks and amorphous scattering and the degree of crystallinity is calculated from the area thereof using the following equation.

$$\text{Degree of crystallinity (\%)} = Ic/(Ic+Ia) \times 100$$

Ic: the total area of the crystalline peaks detected in the range of 5≤2θ≤60;
Ia: the total area of amorphous scattering detected in the range of 5≤2θ≤60.

The degree of crystallinity of the crystalline resin in toner is determined according to the method described above after isolation of the crystalline resin component from the resin contained in the toner. The crystalline resin component may be isolated by Soxhlet extraction of toner with an ethyl acetate solvent which gives the crystalline resin component as a residue. Whether the molecular structure of the extracted residue is a crystalline resin can be confirmed by NMR spectroscopy.

The structure of the crystalline resin of the present invention is now described.

The crystalline polyester resin for toner of the present invention may be any resin that fulfils the above physical properties and is preferably a crystalline resin obtained by condensation polymerization of a dicarboxylic acid component and a diol component.

The crystalline polyester resin for toner of the present invention may be suitably exemplified by crystalline resins obtained by condensation polymerization of a dicarboxylic acid component containing at least one compound selected from the group consisting of terephthalic acid and terephthalic acid derivatives, and a diol component containing at least one compound selected from the group consisting of 2-methyl-1,3-propanediol and derivatives of 2-methyl-1,3-propanediol.

As described above, the crystalline resin of the present invention preferably contains, as a dicarboxylic acid component, at least one compound selected from the group consisting of terephthalic acid and terephthalic acid derivatives.

The derivatives in this context may be exemplified by methyl ester, ethyl ester and acid chloride derivatives of terephthalic acid which provide similar resin structure by condensation polymerization. Specifically, the derivatives may include dimethyl terephthalate, diethyl terephthalate and terephthaloyl dichloride.

By containing, as the dicarboxylic acid component, at least one compound selected from the group consisting of terephthalic acid and terephthalic acid derivatives, the aromatic rings are arranged linearly and the crystalline resin has an increased glass transition temperature and as a result the Young's modulus at room temperature can be controlled within the range defined in the present invention, facilitating crystallization. The dicarboxylic acid component used may have linearly arranged aromatic rings and is not limited to the specific compounds described above.

The dicarboxylic acid component preferably contains, in order to increase the glass transition temperature, increase the Young's modulus at room temperature and facilitate crystallization, 50% by mole or more in total and more preferably 90% by mole or more in total of at least one compound selected from the group consisting of terephthalic acid and terephthalic acid derivatives in the dicarboxylic acid component.

As described above, the crystalline resin of the present invention preferably contains, as the diol component, at least one compound selected from the group consisting of 2-methyl-1,3-propanediol and derivatives of 2-methyl-1,3-propanediol. The derivatives may be exemplified by ester derivatives of 2-methyl-1,3-propanediol which provide similar resin structure by condensation polymerization. Specifically, the derivatives may include 2-methyl-1,3-propanediol dimethacrylate. The 2-methyl-1,3-propanediol has a branched methyl group and thus can decrease the melting point of the resulting crystalline resin.

In order to decrease the melting point of the crystalline resin, the diol component preferably contains 50% by mole or more in total and more preferably 90% by mole or more in total of at least one compound selected from the group consisting of 2-methyl-1,3-propanediol and derivatives of 2-methyl-1,3-propanediol in the diol component.

By containing, as the diol component, at least one compound selected from the group consisting of 2-methyl-1,3-propanediol and derivatives of 2-methyl-1,3-propanediol, a rigid main chain may contain branches due to short methyl groups, thereby increasing the interplanar distance of crystals. Due to this, the resulting crystalline resin may have a reduced melting point and may exhibit low-temperature fixability when contained in toner.

The glass transition temperature correlates with the melting point and thus it is difficult to obtain preferable low-temperature fixability for conventional polyester resins having a glass transition temperature at or above room temperature because the polyester resins may have a melting point of 180° C. or higher.

However, according to the present invention, the melting point can be controlled within the range defined herein by increasing the interplanar distance of crystals without decreasing the glass transition temperature.

The diol component used may have a branch due to a short methyl group and the like on a rigid main chain and is not limited to the specific compounds described above.

When the diol component used contains only 1,3-propanediol or the like without a branch, packing of the main chains may be increased and crystallization of the crystalline resin may be facilitated. However, the resin may have an increased melting point and decreases low-temperature fixability when the resin is contained in toner, resulting in difficulty in obtaining desired effects.

When the diol component used contains only 1,2-butanediol or the like having a large branched moiety, the branched moiety may inhibit crystallization and reduce crystallization.

Upon production of the crystalline resin of the present invention, another carboxylic acid component and alcohol component may be used in combination provided that the above physical properties are not impaired. However, when a long chain aliphatic dicarboxylic acid component having 6 or more carbon atoms or a long chain diol component having 6 or more carbon atoms is used in combination, the resin may have a partially increased mobility, thereby decreasing development durability. Another carboxylic acid component may include, for example, oxalic acid, malonic acid, maleic acid, fumaric acid, citraconic acid, itaconic acid, glutaconic acid, succinic acid; alicyclic dicarboxylic acids such as 1,1-cyclopentenedicarboxylic acid, 1,4-cyclohexanedicarboxylic acid, 1,3-cyclohexanedicarboxylic acid and 1,3-adamantanedicarboxylic acid; aromatic dicarboxylic acids such as phthalic acid, isophthalic acid, p-phenylenediacetic acid, m-phenylenediacetic acid, p-phenylenedipropionic acid, m-phenylenedipropionic acid, naphthalene-1,4-dicarboxylic acid and naphthalene-1,5-dicarboxylic acid; and trivalent or more polycarboxylic acids such as trimellitic acid, pyromellitic acid, naphthalene tricarboxylic acid, naphthalene tetracarboxylic acid, pyrene tricarboxylic acid and pyrene tetracarboxylic acid. Another monomer component is not limited to the above.

Another alcohol component may include dihydroxy alcohols such as 1,2-propanediol, 1,3-propanediol, 1,4-butanediol, 1,5-pentanediol, 1,4-butenediol, cyclohexanediol and cyclohexanedimethanol. Tri- or higher-hydroxy alcohols may include glycerol, pentaerythritol, hexamethylolmelamine, hexaethylolmelamine and the like. However, another monomer component is not limited to the above.

The crystalline resin of the present invention preferably has a weight-average molecular weight (Mw) as measured by gel permeation chromatography (GPC) of at least 5000 and not more than 50000 and more preferably at least 5000 and not more than 20000. When the weight-average molecular weight (Mw) is within the above range, sufficient resin strength can be obtained and simultaneously preferable low-temperature fixability can also be maintained.

The weight-average molecular weight (Mw) of the crystalline resin can be readily controlled according to various known production conditions of crystalline resins.

The weight-average molecular weight (Mw) of the crystalline resin is measured with gel permeation chromatography (GPC) as described hereinbelow.

To o-dichlorobenzene for gel chromatography is added special grade of 2,6-di-t-butyl-4-methylphenol (BHT) to the concentration of 0.10 wt/vol % and dissolved at room temperature. A sample bottle to which a crystalline resin and o-dichlorobenzene with BHT are placed is heated on a hotplate at 150° C. to dissolve the crystalline resin. After the crystalline resin is dissolved, the solution is transferred to a pre-heated filter unit which is then mounted on a main device. The filtered material through the filter unit is obtained as a GPC sample. The sample solution is adjusted so as to have the concentration of about 0.15% by mass. The sample solution is subjected to measurement under the following conditions.

Instrument: HLC-8121GPC/HT (Tosoh Corporation)
Detector: RI for high temperatures
Column: TSKgel GMHHR-H HT 2 in series (Tosoh Corporation)
Temperature: 135.0° C.
Solvent: o-dichlorobenzene for gel chromatography (with 0.10 wt/vol % of BHT)
Flow rate: 1.0 ml/min
Injection: 0.4 ml In order to calculate the molecular weight of the crystalline resin, a molecular weight calibration curve is used which is prepared with standard polystyrene resins (e.g., trade name "TSK standard polystyrenes F-850, F-450, F-288, F-128, F-80, F-40, F-20, F-10, F-4, F-2, F-1, A-5000, A-2500, A-1000, A-500"; Tosoh Corporation).

The weight-average molecular weight (Mw) of the crystalline resin of the present invention in toner is determined according to the method described above after isolation of the crystalline resin component from the resin contained in the toner. The crystalline resin component may be isolated by Soxhlet extraction of toner with an ethyl acetate solvent which gives the crystalline resin component as a residue. Whether the molecular structure of the extracted residue is a crystalline resin can be confirmed by NMR spectroscopy.

When the crystalline resin of the present invention has insufficient crystallization, the resin may be subjected to the treatment for improving crystallization (crystallization treatment) after condensation polymerization of monomers which form the resin or during production of toner.

The crystallization treatment is not particularly limited and may be carried out according to well known methods which may include the followings:

(1) A method in which an organic solvent to which a resin obtained by condensation polymerization of monomers has been dissolved with heating is cooled.
(2) A method in which a resin obtained by condensation polymerization of monomers is dissolved in an organic solvent and the organic solvent is then removed from the resulting resin solution.
(3) A method which is a combination of (1) and (2).

The reason in that these methods can promote crystallization of resins is not clear. It is considered, however, that dissolution of the resin in an organic solvent may mimic reduction of the glass transition temperature, resulting in facilitation of crystallization.

The organic solvent which may be used includes toluene, xylene, acetone, tetrahydrofuran, ethyl acetate, propyl acetate and butyl acetate as well as supercritical $CO_2$.

Particularly the organic solvent having a solubility parameter (SP value) of 8 or more and 9 or less has tendency to facilitate crystallization of the resin.

Specific examples of the method described in (1) may include the following:

(i) To an organic solvent is added a resin obtained by condensation polymerization of monomers and heated to about 60 to 100° C. to dissolve the resin in the organic solvent and prepare a resin solution.
(ii) The obtained resin solution is gradually cooled to 40° C. or less, preferably to about room temperature (e.g., about 25° C.) with a rate of about 1 to 50° C./hr to precipitate the resin. Specific example of the method described in (2) may include the following method.
(i) To an organic solvent is added a resin obtained by condensation polymerization of monomers to prepare a resin solution.
(ii) The obtained resin solution is maintained at about 60 to 100° C. for about 15 minutes to 1 hour.
(iii) The organic solvent is then removed at a temperature of about 4 to 30° C. and pressure of about 250 to 760 mmHg over about 2 to 120 hours to obtain the resin.

The crystalline resin of the present invention has the above features and thus crystallization is halted when the crystalline resin of the present invention is crystallized in the organic solvent and then the organic solvent is eliminated. Therefore the resin has such a feature that it hardly changes over time e.g., undergoes less development of crystallization, during storage thereof in toner.

Particularly, the crystalline resin of the present invention preferably fulfils the following formula (1) as to the amount of heat of fusion as measured by a differential scanning calorimeter (DSC) because the resin may undergo less change over time.

$$H2/H1 \leq 0.1 \qquad \text{formula (1):}$$

wherein H1 (J/g) is the amount of heat of fusion during the first heating from 25° C. to 200° C. with the rate of 10° C./min; and H2 (J/g) is the amount of heat of fusion during the second heating, after cooling to 25° C. with the rate of 1° C./min after the first heating and maintenance at 25° C. for 24 hours, from 25° C. to 200° C. with the rate of 10° C./min.

H1 represents the degree of crystallinity at an initial state and H2 represents the degree of crystallization obtained during gradual cooling in an air atmosphere of the crystalline resin which has been melted once. Accordingly [H2/H1] means how much degree the resin can restore the initial crystallization state in an air atmosphere. The resin having low [H2/H1] thus undergoes less change in the crystal state thereof in an air atmosphere and thus undergoes less change over time during storage.

The amount of heat of fusion of the crystalline resin of the present invention (H1 and H2) can be measured by a differential scanning calorimeter (Mettler Toledo Inc.: DSC822/EK90) according to ASTM D3418-82. Specifically, 0.02 g of sample is weighed in an aluminium pan and the sample is heated from 25° C. to 200° C. with the rate of 10° C./min to determine the amount of heat of fusion H1 (J/g) during this heating. The sample is then cooled with the rate of 1° C./min to 25° C., maintained at 25° C. for 24 hours and again heated from 25° C. to 200° C. with the rate of 10° C./min to measure the amount of heat of fusion H2 (J/g) during this second heating. In the temperature range where an endothermic peak appears, the area surrounded by a differential scanning calorimetry curve obtained with the first heating having an endothermic peak and the baseline of the differential scanning calorimetry curve is used for calculation of the amount of heat absorbed which corresponds to the amount of heat of fusion H1 (J/g). The area surrounded by a differential scanning calorimetry curve obtained with the second heating having an endothermic peak and the baseline of the differential scanning calorimetry curve is used for calculation of the amount of heat absorbed which corresponds to the amount of heat of fusion H2 (J/g).

The above [H2/H1] can be controlled by constituents of the crystalline resin, for example. Specifically, the above range of [H2/H1] can be obtained by including, as the diol component, a diol having a branched structure such as a compound selected from the group consisting of 2-methyl-1,3-propanediol and derivatives thereof.

The amount of heat of fusion (H1 and H2) of the crystalline resin of the present invention in toner can be determined by directly measuring the toner according to the method described above. During the determination, an endothermic peak of wax contained in the toner may be observed in some cases. In order to discriminate the endothermic peak resulting from the wax and the endothermic peak resulting from the crystalline resin, the wax is extracted from the toner by Soxhlet extraction using a hexane solvent, the isolated wax is subjected to the differential scanning calorimetry according to the method described above and the obtained endothermic peak is compared with the endothermic peak of the toner.

The toner of the present invention contains the crystalline polyester resin for toner of the present invention.

The toner of the present invention can be produced by well known production methods without limitation such as pulverization method, suspension polymerization method, emulsion aggregation method and dissolution suspension method. Among these production methods, the toner of the present invention is preferably produced by dissolution suspension method in view of controlling the crystallization of the crystalline resin of the present invention.

The method for producing the toner by dissolution suspension method is hereinafter exemplified.

The dissolution suspension method refers to a method for producing toner by dissolving or dispersing a resin, a colorant, a release agent and the like in an organic solvent, dispersing the resulting solution or dispersion in a poor solvent such as water approximately at the size of toner particles and distilling the organic solvent off in this state. In the dissolution suspension method, toner is produced through the resin dissolution step, the granulating step, the solvent removal step and the washing and drying step.

The method for producing toner of the present invention may include, for example, a method including the step of dissolving at least the crystalline polyester resin for toner of the present invention or a resin corresponding to the crystalline polyester resin for toner of the present invention prior to the crystallization treatment (hereinafter also referred to as the pre-crystallization treatment resin) in an organic solvent to obtain a resin composition (resin dissolution step), the step of dispersing the resulting resin composition in a dispersion medium (an aqueous medium or supercritical/subcritical $CO_2$ medium) to obtain a dispersion (granulating step) and the step of removing the organic solvent from the resulting dispersion (solvent removal step).

<Resin Dissolution Step>

The resin dissolution step is a step wherein, for example, in an organic solvent the crystalline resin of the present invention or the resin corresponding to the crystalline resin of the present invention prior to the crystallization treatment is dissolved with heating to prepare the resin solution and optionally another resin, colorant, release agent and the like are dissolved or dispersed in the resin solution to produce the resin composition.

Suitable embodiment may be exemplified by, but not limited to, dissolving in an organic solvent a polyester resin which is obtained by condensation polymerization of a dicarboxylic acid component containing at least one compound selected from the group consisting of terephthalic acid and terephthalic acid derivatives, and a diol component containing at least one compound selected from the group consisting of 2-methyl-1,3-propanediol and derivatives of 2-methyl-1,3-propanediol and has a weight-average molecular weight as measured with gel permeation chromatography of at least 5000 and not more than 50000 to obtain a resin composition.

The organic solvent used may be any organic solvent that can dissolve the resin. Specifically, the organic solvent may include toluene, xylene, chloroform, methylene chloride, ethyl acetate and the like. In the present invention, it is preferable to use toluene or ethyl acetate because crystallization of the crystalline resin is facilitated and the solvent can be easily removed. When a solvent such as toluene having high efficacy for promoting crystallization is used alone, the resulting toner may easily have hollow structure, resulting in tendency of reduction in strength. Accordingly the reduction in strength can be prevented by adding a solvent such as chloroform having low efficacy for promoting crystallization to a solvent such as toluene having high efficacy for promoting crystallization. The combined use of a solvent having high efficacy for promoting crystallization with a solvent having low efficacy for promoting crystallization allow the solid structure of the resulting toner, resulting in an improved strength. As a result the resulting toner has less fracture when the toner is used on copying machines and the like.

The efficacy of the organic solvent for promoting crystallization can be determined based on the presence or absence of the precipitation of the crystalline resin after dissolving the crystalline resin in the organic solvent optionally with heating at a concentration of 70% by mass, cooling to 25° C. and allowing the solution to stand for 24 hours. When the efficacy for promoting crystallization is high, the crystalline resin is precipitated in the organic solvent and when the efficacy for promoting crystallization is low, the precipitation does not occur.

In the present invention, the organic solvent may be suitably exemplified by a solvent containing at least an organic solvent A (solvent having high efficacy for promoting crystallization) and an organic solvent B (solvent having low efficacy for promoting crystallization) and fulfilling the following conditions (1) and (2).

(1) When the crystalline polyester resin for toner is dissolved in the organic solvent A at a concentration of 70% by mass and allowed to stand at 25° C. for 24 hours, the crystalline polyester resin for toner is precipitated.

(2) When the crystalline polyester resin for toner is dissolved in the organic solvent B at a concentration of 70% by mass and allowed to stand at 25° C. for 24 hours, the crystalline polyester resin for toner is not precipitated.

The mixing ratio (mass ratio) of the organic solvent A and the organic solvent B is preferably 10/1 to 1/10 in view of achieving both promotion of crystallization of toner and prevention of reduction in mechanical strength of toner (namely improvement in development durability). The ratio is more preferably 5/1 to 1/5 in view of achieving both promotion of crystallization of toner and prevention of reduction in mechanical strength of toner (namely improvement in development durability).

The amount of the organic solvent used is not limited and may be the amount that allows dispersion and granulation of the resin composition in the dispersion medium. Specifically, the mass ratio between the resin composition containing the crystalline resin of the present invention, another resin, colorant, release agent and the like and the organic solvent is preferably 10/90 to 50/50 in view of granulating properties and production efficiency of toner as described hereinbelow.

In the present invention, a binder resin for toner such as resins other than the crystalline resin of the present invention may be used. However, the toner preferably contains the crystalline resin of the present invention at 10 to 100% by mass, and more preferably 30 to 100% by mass based on the total mass of the toner.

In order to use another resin in combination and efficiently exhibit the effect of the crystalline resin of the present invention, it is preferable to design the toner according to a well known method so that the crystalline resin of the present invention exists on the outside of the resulting toner. For example in the dissolution suspension method, the resulting toner may have the crystalline resin of the present invention on the outside thereof by using the crystalline resin of the present invention as a binder resin of the toner, another resin used is selected so as to have a lower hydrophilicity than that of the crystalline resin of the present invention or rendering the crystalline resin of the present invention to have higher hydrophilicity than another resin. Another resin which can be used may include well known thermoplastic binder resins, specifically styrene acrylic resins, epoxy resins, polyester resins, polyurethane resins, polyamide resins, cellulose resins, polyether resins and the like.

Meanwhile a colorant and a release agent are not required to be dissolved in the organic solvent and may be dispersed therein. When the colorant and the release agent are used in dispersed state, they are preferably dispersed by using a disperser such as a bead mill and the like.

The colorant which can be used is not particularly limited and may include well known organic pigments or oil dyes, carbon black, magnetic powder and the like. Cyan colorants may include copper phthalocyanine compounds and derivatives thereof, anthraquinone compounds, basic dye lake compounds and the like. Magenta colorants may include condensed azo compounds, diketopyrrolopyrrole compounds, anthraquinone, quinacridone compounds, basic dye lake compounds, naphthol compounds, benzimidazolone compounds, thioindigo compounds, perylene compounds and the like.

Yellow colorants may typically include condensed azo compounds, isoindolinone compounds, anthraquinone compounds, azo metal complexes, methine compounds, arylamide compounds and the like.

Black colorants may include carbon black or magnetic powder or colorants obtained by toning the yellow, magenta and cyan colorants to black. The colorants may be used alone or in combination and may be used in the form of solid solution. The colorant used in the present invention may be selected according to hue angle, chroma, lightness, lightfastness, OHP transparency and dispersibility in toner.

In the present invention, the amount of the cyan, magenta, yellow or black colorant is preferably, relative to 100 parts by mass of the resin constituting the toner, 1 to 20 parts by mass.

The release agent which can be used is not particularly limited and may include, for example, low-molecular weight polyolefins such as polyethylenes; silicones having a melting point (softening point) by heating; aliphatic amides such as oleamide, erucamide, ricinoleic acid amide and stearic acid amide; ester waxes such as stearyl stearate; plant waxes such as carnauba wax, rice wax, candelilla wax, vegetable wax and jojoba oil; animal waxes such as bees wax; mineral/petroleum waxes such as montan wax, ozocerite, ceresin, paraffin wax, microcrystalline wax, Fischer-Tropsch wax and ester wax; and modified products thereof.

The release agent preferably has a melting point of 150.0° C. or lower, more preferably 40.0° C. to 130.0° C. and particularly preferably 40.0 to 110.0° C. The amount of the release agent used is preferably, relative to 100 parts by mass of the resin constituting the toner, 1 to 20 parts by mass.

<Granulating Step>

The granulating step is a step wherein the resulting resin composition is dispersed in a dispersion medium so as to obtain a predetermined toner particle diameter with a dispersing agent to prepare a dispersion (granulated product). In the granulating step, the dispersion medium is preferably an aqueous medium and the aqueous medium is preferably maintained at not less than 60 and not more than 100° C. The aqueous medium mainly is water. The aqueous medium preferably contains a monovalent metal salt at not less than 1% by mass and not more than 30% by mass. Inclusion of the monovalent metal salt may suppress diffusion of the organic solvent contained in the resin composition into the aqueous medium. Thereby the crystalline property of the resin in the resulting toner particles may be improved, the toner may easily have preferable blocking property, and due to the improvement in crystalline property, the crystalline resin may have an improved Young's modulus and improved development durability.

The monovalent metal salt may be exemplified by sodium chloride, potassium chloride, lithium chloride and potassium bromide among which sodium chloride and potassium chloride are preferable.

The mixing ratio (mass ratio) between the aqueous medium and the resin composition is preferably aqueous medium/resin composition=90/10 to 50/50.

The dispersing agent is not particularly limited and may be organic dispersing agents such as cationic, anionic and nonionic surfactants among which anionic surfactants are preferable. For example, sodium alkyl benzene sulphonates, sodium α-olefin sulphonates, sodium alkyl sulphonates, sodium alkyl diphenyl ether disulphonates and the like may be mentioned. Meanwhile inorganic dispersing agents may include tricalcium phosphate, hydroxyapatite, calcium carbonate, titanium oxide, silica powder and the like.

In the present invention, an inorganic dispersing agent which is tricalcium phosphate is preferable because of granulating properties and stability thereof as well as extremely low adverse effect to the properties of the resulting toner.

The amount of the dispersing agent added may be selected according to the particle diameter of the granulated product and when the amount of the dispersing agent added is increased, the particle diameter is decreased. Due to this reason, the amount of the dispersing agent added varies according to the desired particle diameter and is preferably in the range of 0.1 to 15% by mass relative to the resin composition. When the amount is less than 0.1% by mass, coarse powder may be easily produced and when the amount is higher than 15% by mass, unwanted fine particles may be easily produced. The dispersion of the resin composition in the aqueous medium is preferably prepared under high speed shearing. The dispersion of the resin composition in the aqueous medium is preferably granulated to have a weight average particle diameter of 10 μm or lower and more preferably about 4 to 9 μm.

The device which provides high speed shearing may include various high speed dispersers and ultrasonic dispersers.

The weight average particle diameter of the dispersion can be determined by the Coulter method on a particle size distribution analyzer (Coulter Multisizer III: Coulter Inc.).

<Solvent Removal Step>

The solvent removal step is a step wherein the organic solvent is removed from the resulting dispersion. The organic solvent is preferably removed gradually with stirring. The rate of removal of the organic solvent can also be controlled by optional heating and reduction of pressure.

In a method for forming a dispersion in an aqueous medium such as the dissolution suspension method as exemplified, the crystallization treatment described above may be included in the production procedure, thereby crystallization of the crystalline resin of the present invention can be further secured.

For example, a method may be mentioned in which in a previous step of the solvent removal step, namely in the granulating step, the aqueous medium is maintained at a heated status of 60° C. or higher and 100° C. or lower and after the granulating step and before the solvent removal step or in the solvent removal step, the aqueous medium is cooled to 40° C. or lower, preferably to about room temperature (e.g., about 25° C.) during stirring with a cooling rate of 1° C./hr or more and 50° C./hr or less to precipitate and crystallize the crystalline resin before removing the organic solvent. It is also a suitable procedure in which the crystalline resin of the present invention is dissolved in the organic solvent over a sufficient length of time in order to decrease the rate of solvent removal and facilitate crystallization. More specifically, a method may be mentioned in which the organic solvent is removed from the resulting dispersion at a temperature of about 4 to 30° C. and pressure of about 250 to 760 mmHg over 2 to 120 hours. It is more preferable that the organic solvent is removed over 24 hours or more and more preferably 72 hours or more.

<Washing and Drying Step>

After the solvent removal step, the washing and drying step may be carried out in which toner particles are washed for multiple times with water and the like and filtered and dried. When the dispersing agent is used which dissolves under acidic conditions such as tricalcium phosphate, it is preferable that the toner particles are washed with hydrochloric acid and the like before washing with water. By washing, the dispersing agent used for granulation can be removed and the toner properties can be improved. After washing, toner can be obtained following filtration and drying. The obtained toner may be optionally added with inorganic fine particles such as silica, alumina, titania and calcium carbonate or resin particles such as vinyl resins, polyester resins, silicone resins while shear force is applied under dry conditions. The inorganic fine particles and resin particles may function as an external additive such as an auxiliary agent for charging, an auxiliary agent for flowability and an auxiliary agent for cleaning.

The toner of the present invention preferably has a residual amount of toner on a sieve with a mesh size of 75 μm of 10% or less as measured after leaving the toner at 40° C. for 3 days and sieving the toner with the sieve at a shaking width of 1 mm for 120 seconds. The toner containing the crystalline resin for toner of the present invention on the outside thereof tends to fulfill the above condition and have further preferable blocking property.

EXAMPLES

The present invention is hereinafter described in further detail by way of Examples and Comparative Examples, which by no means limit the present invention.

(Production of Resin)

<Production of Polyester Resin 1>

| Dicarboxylic acid component: | |
|---|---|
| Dimethyl terephthalate | 100 parts by mole |
| Diol component: | |
| 2-Methyl-1,3-propanediol | 200 parts by mole |

In a sufficiently heated two-neck flask were charged the above monomer components, 0.05 parts by mass of tetraisopropyl orthotitanate was added relative to 100 parts by mass of the mixture, nitrogen gas was introduced in the flask which was then heated while maintaining an inert atmosphere to carry out condensation polymerization at 230° C., followed by reduction of pressure and heating to 250° C. in order to polymerize a resin.

The obtained resin was subjected to crystallization treatment as follows. The obtained resin (40 parts by mass) was added to a beaker containing 160 parts by mass of toluene which was then heated to 90° C. to dissolve the resin, followed by gradual cooling to 25° C. over 6 hours to precipitate the resin. The precipitated resin was filtered and dried to give polyester resin 1 (weight-average molecular weight [Mw]: 9500, glass transition temperature [Tg]: 42° C., melting point [Mp]: 81° C.).

<Production of Polyester Resin 2>

Polyester resin 2 (Mw: 6400, glass transition temperature: 30° C., melting point: 79° C.) was obtained in the similar manner as the production of polyester resin 1 except that tetraisopropyl orthotitanate was added at the amount of 0.03 parts by mass.

<Production of Polyester Resin 3>

Polyester resin 3 (Mw: 42000, glass transition temperature: 50° C., melting point: 83° C.) was obtained in the similar manner as the production of polyester resin 1 except that tetraisopropyl orthotitanate was added at the amount of 0.10 parts by mass.

<Production of Polyester Resin 4>

| Dicarboxylic acid component: | |
|---|---|
| Dimethyl terephthalate | 100 parts by mole |
| Diol component: | |
| 2-Methyl-1,3-propanediol | 100 parts by mole |
| 1,4-Butanediol | 100 parts by mole |

Polyester resin 4 (Mw: 17000, glass transition temperature: 28° C., melting point: 107° C.) was obtained in the similar manner as the production of polyester resin 1 except that the monomer components used were as shown above.

<Production of Polyester Resin 5>

| Dicarboxylic acid component: | |
| --- | --- |
| Dimethyl terephthalate | 100 parts by mole |
| Diol component: | |
| 2-Methyl-1,3-propanediol | 150 parts by mole |
| 1,4-Butanediol | 50 parts by mole |

Polyester resin 5 (Mw: 8900, glass transition temperature: 34° C., melting point: 79° C.) was obtained in the similar manner as the production of polyester resin 1 except that the monomer components used were as shown above.

<Production of Polyester Resin 6>

| Dicarboxylic acid component: | |
| --- | --- |
| Dimethyl terephthalate | 100 parts by mole |
| Diol component: | |
| 2-Methyl-1,3-propanediol | 150 parts by mole |
| 1,3-Propanediol | 50 parts by mole |

Polyester resin 6 (Mw: 10000, glass transition temperature: 38° C., melting point: 106° C.) was obtained in the similar manner as the production of polyester resin 1 except that the monomer components used were as shown above.

<Production of Polyester Resin 7>

| Dicarboxylic acid component: | |
| --- | --- |
| Decanedicarboxylic acid | 100 parts by mole |
| Diol component: | |
| 1,6-Hexanediol | 200 parts by mole |

In a sufficiently heated two-neck flask were charged the above monomer components, 0.05 parts by mass of tetraisopropyl orthotitanate was added relative to 100 parts by mass of the mixture, nitrogen gas was introduced in the flask which was then heated while maintaining an inert atmosphere to carry out condensation polymerization at 230° C., followed by reduction of pressure and heating to 250° C. in order to polymerize a resin. The obtained resin was dried to give polyester resin 7 (Mw: 27000, glass transition temperature: −62° C., melting point: 67° C.).

<Production of Polyester Resin 8>

| Dicarboxylic acid component: | |
| --- | --- |
| Decanedicarboxylic acid | 100 parts by mole |
| Diol component: | |
| 1,10-Decanediol | 200 parts by mole |

Polyester resin 8 (Mw: 37000, glass transition temperature: −57° C., melting point: 77° C.) was obtained in the similar manner as the production of polyester resin 7 except that the monomer components used were as shown above.

<Production of Polyester Resin 9>

| Dicarboxylic acid component: | |
| --- | --- |
| Dimethyl terephthalate | 100 parts by mole |
| Diol component: | |
| 1,3-Propanediol | 200 parts by mole |

Polyester resin 9 (Mw: 9100, glass transition temperature: 38° C., melting point: 227° C.) was obtained in the similar manner as the production of polyester resin 7 except that the monomer components used were as shown above.

<Production of Polyester Resin 10>

| Dicarboxylic acid component: | |
| --- | --- |
| Dimethyl terephthalate | 100 parts by mole |
| Diol component: | |
| 1,3-Propanediol | 200 parts by mole |

Polyester resin 10 (Mw: 9100, glass transition temperature: 38° C., melting point: 230° C.) was obtained in the similar manner as the production of polyester resin 1 except that the monomer components used were as shown above.

<Production of Polyester Resin 11>

| Dicarboxylic acid component: | |
| --- | --- |
| Dimethyl terephthalate | 100 parts by mole |
| Diol component: | |
| 1,2-Ethylene glycol | 200 parts by mole |

Polyester resin 11 (Mw: 15000, glass transition temperature: 65° C., melting point: 243° C.) was obtained in the similar manner as the production of polyester resin 7 except that the monomer components used were as shown above.

<Production of Polyester Resin 12>

| Dicarboxylic acid component: | |
| --- | --- |
| Dimethyl terephthalate | 100 parts by mole |
| Diol component: | |
| 2-Methyl-1,3-propanediol | 200 parts by mole |

Polyester resin 12 (Mw: 9500, glass transition temperature: 42° C., melting point: not applicable) was obtained in the similar manner as the production of polyester resin 7 except that the monomer components used were as shown above.

<Production of Polyester Resin 13>

| Dicarboxylic acid component: | |
| --- | --- |
| Dimethyl terephthalate | 100 parts by mole |
| Diol component: | |
| 1,3-Butanediol | 200 parts by mole |

Polyester resin 13 (Mw: 6400, glass transition temperature: 30° C., melting point: not applicable) was obtained in the similar manner as the production of polyester resin 1 except that the monomer components used were as shown above.

<Production of Polyester Resin 14>

Dicarboxylic acid component:

| | |
|---|---|
| Dimethyl terephthalate | 100 parts by mole |

Diol component:

| | |
|---|---|
| 1,2-Propanediol | 200 parts by mole |

Polyester resin 14 (Mw: 8900, glass transition temperature: 73° C., melting point: not applicable) was obtained in the similar manner as the production of polyester resin 1 except that the monomer components used were as shown above.

<Production of Polyester Resin 15>

Dicarboxylic acid component:

| | |
|---|---|
| Dimethyl terephthalate | 100 parts by mole |

Diol component:

| | |
|---|---|
| 1,2-Butanediol | 200 parts by mole |

Polyester resin 15 (MW: 7200, glass transition temperature: 58° C., melting point: not applicable) was obtained in the similar manner as the production of polyester resin 1 except that the monomer components used were as shown above.

<Production of Polyester Resin 16>

Dicarboxylic acid component:

| | |
|---|---|
| Terephthalic acid | 80 parts by mole |
| Dodecyl succinate | 20 parts by mole |

Diol component:

| | |
|---|---|
| Bisphenol A-ethylene oxide (BPA-EO) 2-mole adduct | 33 parts by mole |
| Bisphenol A-propylene oxide (BPA-PO) 2-mole adduct | 67 parts by mole |

Polyester resin 16 (Mw: 14000, glass transition temperature: 56° C., melting point: not applicable) was obtained in the similar manner as the production of polyester resin 7 except that the monomer components used were as shown above.

<Production of Polyester Resin 17>

Dicarboxylic acid component:

| | |
|---|---|
| Terephthalic acid | 80 parts by mole |
| Dodecyl succinate | 20 parts by mole |

Diol component:

| | |
|---|---|
| Bisphenol A-ethylene oxide (BPA-EO) 2-mole adduct | 33 parts by mole |
| Bisphenol A-propylene oxide (BPA-PO) 2-mole adduct | 67 parts by mole |

Polyester resin 17 (Mw: 14000, glass transition temperature: 56° C., melting point: not applicable) was obtained in the similar manner as the production of polyester resin 1 except that the monomer components used were as shown above.

Physical properties of the obtained polyester resins are show in Table 1.

TABLE 1

| Resin | Dicarboxylic acid | Diol | Crystallization treatment | Crystalline property | Young's modulus (GPa) | Melting point (° C.) | Tg (° C.) | Degree of crystallinity (%) | H1 | H2 | H2/H1 |
|---|---|---|---|---|---|---|---|---|---|---|---|
| 1 | Dimethyl terephthalate | 2-Methyl-1,3-propanediol | Yes | Yes | 3.4 | 81 | 42 | 29 | 29 | 0 | 0 |
| 2 | Dimethyl terephthalate | 2-Methyl-1,3-propanediol | Yes | Yes | 2.9 | 79 | 30 | 25 | 26 | 0 | 0 |
| 3 | Dimethyl terephthalate | 2-Methyl-1,3-propanediol | Yes | Yes | 3.8 | 83 | 50 | 23 | 21 | 0 | 0 |
| 4 | Dimethyl terephthalate | 2-Methyl-1,3-propanediol 1,4-Butanediol | Yes | Yes | 2.4 | 107 | 28 | 15 | 25 | 0 | 0 |
| 5 | Dimethyl terephthalate | 2-Methyl-1,3-propanediol 1,4-Butanediol | Yes | Yes | 2.7 | 79 | 34 | 9 | 18 | 0 | 0 |
| 6 | Dimethyl terephthalate | 2-Methyl-1,3-propanediol 1,3-Propanediol | Yes | Yes | 3.6 | 106 | 38 | 24 | 19 | 0 | 0 |
| 7 | Decanedicarboxylic acid | 1,6-Hexanediol | No | Yes | 1.3 | 67 | −62 | 56 | 97 | 78 | 0.80 |
| 8 | Decanedicarboxylic acid | 1,10-Decanediol | No | Yes | 1.4 | 77 | −57 | 52 | 132 | 112 | 0.85 |
| 9 | Dimethyl terephthalate | 1,3-Propanediol | No | Yes | 3.8 | 227 | 38 | 30 | 68 | 66 | 0.97 |
| 10 | Dimethyl terephthalate | 1,3-Propanediol | Yes | Yes | 3.8 | 230 | 38 | 30 | 71 | 66 | 0.93 |
| 11 | Dimethyl terephthalate | 1,2-Ethylene glycol | No | Yes | 4.5 | 243 | 65 | 41 | 44 | 41 | 0.93 |
| 12 | Dimethyl terephthalate | 2-Methyl-1,3-propanediol | No | No | 3.3 | — | 42 | — | — | — | — |
| 13 | Dimethyl terephthalate | 1,3-Butanediol | Yes | No | 3.0 | — | 30 | — | — | — | — |
| 14 | Dimethyl terephthalate | 1,2-Propanediol | Yes | No | 4.6 | — | 73 | — | — | — | — |
| 15 | Dimethyl terephthalate | 1,2-Butanediol | Yes | No | 3.4 | — | 58 | — | — | — | — |
| 16 | Terephthalic acid Dodecyl succinate | BPA-EO adduct BPA-PO adduct | No | No | 3.1 | — | 56 | — | — | — | — |
| 17 | Terephthalic acid Dodecyl succinate | BPA-EO adduct BPA-PO adduct | Yes | No | 3.1 | — | 56 | — | — | — | — |

Example 1

(Production of Toner 1)

To a beaker in a water bath were added 11.7 parts by mass of trisodium phosphate dodecahydrate (Wako Pure Chemical Industries, Ltd.) and 1200 parts by mass of ion exchange water to dissolve trisodium phosphate dodecahydrate. The water bath was then heated to 60° C. After the temperature reached to 60° C., an aqueous solution of calcium chloride (Kishida Chemical Co., Ltd.) was added which was obtained by dissolving 5.15 parts by mass of calcium chloride to 100 parts by mass of ion exchange water. The solution was stirred for 30 minutes thereafter to obtain an aqueous solution of tricalcium phosphate corresponding to an aqueous medium containing a dispersing agent.

Next, the following materials:

| | |
|---|---|
| Resin 1 before crystallization treatment | 40 parts by mass |
| Colorant | 2 parts by mass |
| (cyan pigment, Dainichiseika Color & Chemicals Mfg. Co., Ltd.: Pigment Blue 15:3) | |
| Release agent (behenyl behenate, melting point: 75° C.) | 4 parts by mass |
| Toluene | 160 parts by mass | were mixed and heated while stirring to 80° C. to dissolve and disperse the materials to prepare a resin composition. The tricalcium phosphate aqueous solution (600 parts by mass) was heated to 80° C. while stirring on Clearmix (M Technique Co., Ltd.). To the tricalcium phosphate aqueous solution was added the resin composition before stirring at 10000 rpm for 10 minutes to obtain dispersion. The obtained dispersion was cooled to 25° C. over 12 hours while stirring with a stirring blade and stirring at a temperature of 25° C. and under normal pressure was continued for 3 days to remove toluene. The resulting resin particles were analyzed for the particle diameter by the Coulter method on a particle size distribution analyzer (Coulter Multisizer III: Coulter Inc.) and it was found that the particles had a weight average particle diameter of 5.5 μm. The particles were washed with a hydrochloric acid aqueous solution, filtered, then washed with ion exchange water and filtered for solid-liquid separation. The obtained solid matter was dried to obtain toner 1. The obtained toner had a weight average particle diameter of 5.5 μm and had a hollow structure.

Example 2

(Production of Toner 2)

Toner 2 was produced in the similar manner as Example 1 except that 40 parts by mass of toluene and 120 parts by mass of chloroform were used in combination instead of 160 parts by mass of toluene. Particles of the obtained toner 2 had a weight average particle diameter of 5.5 μm and had a solid structure.

The polyester resin formed in the toner was dissolved by heating in toluene at a concentration of 70% by mass and the solution was left to stand at 25° C. for 24 hours to precipitate polyester resin 1 in the form of crystal. When the polyester resin formed in the toner was dissolved by heating in chloroform at a concentration of 70% by mass and the solution was left to stand at 25° C. for 24 hours, polyester resin 1 was not precipitated.

Example 3

(Production of Toner 3)

Toner 3 was produced in the similar manner as Example 2 except that 40 parts by mass of sodium chloride was added to the tricalcium phosphate aqueous solution. Particles of the obtained toner 3 had a weight average particle diameter of 5.5 μm and had a solid structure. As shown in Table 2, the degree of crystallinity was significantly increased by addition of sodium chloride.

Example 4

(Production of Toner 4)

Toner 4 was produced in the similar manner as Example 3 except that polyester resin 2 before crystallization treatment was used instead of polyester resin 1 before crystallization treatment. The obtained toner particles 4 had a weight average particle diameter of 5.5 μm and had a solid structure.

Example 5

(Production of Toner 5)

Toner 5 was produced in the similar manner as Example 3 except that polyester resin 3 before crystallization treatment was used instead of polyester resin 1 before crystallization treatment. The obtained toner particles 5 had a weight average particle diameter of 5.5 μm and had a solid structure.

Example 6

(Production of Toner 6)

Toner 6 was produced in the similar manner as Example 3 except that polyester resin 4 before crystallization treatment was used instead of polyester resin 1 before crystallization treatment. The obtained toner particles 6 had a weight average particle diameter of 5.5 μm and had a solid structure.

Example 7

(Production of Toner 7)

Toner 7 was produced in the similar manner as Example 3 except that polyester resin 5 before crystallization treatment was used instead of polyester resin 1 before crystallization treatment. The obtained toner particles 7 had a weight average particle diameter of 5.5 μm and had a solid structure.

Example 8

(Production of Toner 8)

Toner 8 was produced in the similar manner as Example 3 except that polyester resin 6 before crystallization treatment was used instead of polyester resin 1 before crystallization treatment. The obtained toner particles 8 had a weight average particle diameter of 5.5 μm and had a solid structure.

Comparative Example 1

(Production of Toner 9)

| | |
|---|---|
| Polyester resin 7 | 100 parts by mass |
| Release agent (behenyl behenate, melting point: 75° C.) | 10 parts by mass |
| Colorant | 5 parts by mass |
| (cyan pigment, Dainichiseika Color & Chemicals Mfg. Co., Ltd.: Pigment Blue 15:3) | |

The mixture obtained by mixing the above materials was subjected to melt-kneading on a twin-screw extruder heated at 130° C. The obtained melt-kneading product was cooled and coarsely pulverized with a hammer mill. The obtained coarsely pulverized product was finely pulverized with a turbo mill, the obtained fine powder was classified on an air classifier to obtain toner 9 having a weight average particle diameter of 7 μm.

Comparative Example 2

(Production of Toner 10)

Toner 10 was produced in the similar manner as Comparative Example 1 except that polyester resin 8 was used instead of polyester resin 7. The obtained toner 10 had a weight average particle diameter of 7 μm.

Comparative Example 3

(Production of Toner 11)

Toner 11 was produced in the similar manner as Comparative Example 1 except that polyester resin 9 was used instead of polyester resin 7. The obtained toner 11 had a weight average particle diameter of 7 µm.

Comparative Example 4

(Production of Toner 12)

Toner 12 was produced in the similar manner as Comparative Example 1 except that polyester resin 10 was used instead of polyester resin 7. The obtained toner 12 had a weight average particle diameter of 7 µm.

Comparative Example 5

(Production of Toner 13)

Toner 13 was produced in the similar manner as Comparative Example 1 except that polyester resin 11 was used instead of polyester resin 7. The obtained toner 13 had a weight average particle diameter of 7 µm.

Comparative Example 6

(Production of Toner 14)

Toner 14 having a weight average particle diameter of 5.5 µm was obtained in the similar manner as Example 3 except that polyester resin 12 was used instead of polyester resin 1 before crystallization treatment and the obtained dispersion was cooled from 80° C. to 50° C. over 10 minutes while stirring with a stirring blade and stirring at a temperature of 50° C. was continued for 5 hours to remove toluene.

Comparative Example 7

(Production of Toner 15)

Toner 15 was produced in the similar manner as Example 3 except that polyester resin 13 was used instead of polyester resin 1 before crystallization treatment. The obtained toner 15 had a weight average particle diameter of 5.5 µm.

Comparative Example 8

(Production of Toner 16)

Toner 16 was produced in the similar manner as Example 3 except that polyester resin 14 was used instead of polyester resin 1 before crystallization treatment. The obtained toner 16 had a weight average particle diameter of 5.5 µm.

Comparative Example 9

(Production of Toner 17)

Toner 17 was produced in the similar manner as Example 3 except that polyester resin 15 was used instead of polyester resin 1 before crystallization treatment. The obtained toner 17 had a weight average particle diameter of 5.5 µm.

Comparative Example 10

(Production of Toner 18)

Toner 18 was produced in the similar manner as Comparative Example 1 except that polyester resin 16 was used instead of polyester resin 7. The obtained toner 18 had a weight average particle diameter of 7 µm.

Comparative Example 11

(Production of Toner 19)

Toner 19 was produced in the similar manner as Comparative Example 1 except that polyester resin 17 was used instead of polyester resin 7. The obtained toner 19 had a weight average particle diameter of 7 µm.

(Evaluation of Toner)

<Evaluation 1 of Blocking Property (Evaluation Using a Sieve)>

Toner (10 g) was left to stand at 40° C. for 3 days and then sieved on a sieve having a mesh size of 75 µm at a shaking width of 1 mm for 120 seconds. The residual amount of toner on the sieve was evaluated according to the following criteria. The evaluation result is shown in Table 2.

(Evaluation Criteria)

A: the residual amount of toner is 10% or less;
B: the residual amount of toner is more than 10%.

<Evaluation of Low-Temperature Fixability>

Toner (100 parts by mass) and 1.8 parts by mass of silica fine powder (BET specific surface area=200 m$^2$/g, subjected to hydrophobic treatment with silicone oil) were dry-mixed on a Henschel mixer (Mitsui Mining Co., Ltd.) to prepare toner containing the external additive. The toner and a ferrite carrier (average particle diameter: 42 µm) which had been surface coated with a silicone resin were mixed so as to obtain a toner concentration of 8% by mass and prepare a two-component developer. The two-component developer was charged in a commercially available full color digital copying machine (CLC1100, Canon, Inc.) and used to form an unfixed toner image (0.6 mg/cm$^2$) on a receiver paper (64 g/m$^2$). A fixation unit detached from a commercially available full color digital copying machine (imageRUNNER ADVANCE C5051, Canon, Inc.) was altered so that the fixation temperature can be adjusted. The fixation test of the unfixed image was carried out with the fixation unit. The fixation of the unfixed image was visually evaluated under normal temperature and normal humidity with a processing speed of 246 mm/sec. The evaluation result is shown in Table 2.

(Evaluation Criteria)

A: The image is able to be fixed at or lower than 140° C.;
B: The image is able to be fixed at higher than 140° C. and at or lower than 160° C.;
C: The image is only able to be fixed at higher than 160° C.

<Evaluation of Development Durability>

Toner (100 parts by mass) was dry-mixed with 2.5 parts by mass of silica fine particles 1 (number average particle diameter of primary particles=100 nm, subjected to hydrophobic treatment with silicone oil) and 0.5 parts by mass of silica fine particles 2 (number average particle diameter of primary particles=20 nm, subjected to hydrophobic treatment with silicone oil) on a Henschel mixer (Mitsui Mining Co., Ltd.) to prepare toner containing external additives. The toner and a ferrite carrier (average particle diameter: 42 µm) which had been surface coated with a silicone resin were mixed so as to obtain a toner concentration of 8% by mass and prepare a two-component developer. The two-component developer (280 g) was charged in a developing unit of a commercially available full color digital copying machine (imagePRESS C1, Canon, Inc.) and the developing unit containing the two-component developer was attached on the full color digital copying machine (imagePRESS C1, Canon, Inc.). The copying machine was allowed to continuously run under the conditions of room temperature of 25° C. and humidity of 50% RH at a processing speed of 500 mm/sec in the mode without consumption of toner. After the run in the mode without consumption of toner, development durability was evaluated by electron microscope observation of toner surface and visual observation of surface of the developing roller. The evaluation result is shown in Table 2.
(Evaluation Criteria)
A: After 2 hours, noticeable binding of toner on the developing roller is not observed under visual inspection. Electron microscope observation reveals that at least part of silica fine particles 1 is not completely embedded in toner;
B: After 30 minutes, noticeable binding of toner on the developing roller is not observed under visual inspection. Electron microscope observation reveals that at least part of silica fine particles 1 is not completely embedded in toner. After 2 hours, noticeable binding of toner on the developing roller is not observed under visual inspection; however electron microscope observation reveals that silica fine particles 1 are almost completely embedded in toner;
C: After 30 minutes, noticeable binding of toner on the developing roller is not observed under visual inspection; however electron microscope observation reveals that silica fine particles 1 are almost completely embedded in toner;
D: After 30 minutes, visual observation reveals that a high amount of toner adheres to the developing roller.

<Evaluation 2 of Blocking Property (Evaluation by Storage Stability)>

Toner (100 parts by mass) was dry-mixed with 1.8 parts by mass of silica fine particles which had a specific surface area as measured by the BET method of 200 $m^2/g$ and had been subjected to hydrophobic treatment with silicone oil on a Henschel mixer (Mitsui Mining Co., Ltd.) to prepare toner containing the external additive. The toner was left to stand in an incubator with constant temperature of 50° C. and constant humidity of 10% for 3 days and the degree of blocking was visually evaluated according to the following criteria. The evaluation result is shown in Table 2.

(Evaluation Criteria)
A: After 3 days, even when the blocking of toner occurs, the toner can be dispersed easily with slight vibration;
B: After 3 days, the blocking of toner occurs and the toner can be dispersed with continuous vibration;
C: After 3 days, the blocking of toner occurs and the toner cannot be dispersed even when force is applied.

TABLE 2

| | Toner | Resin | Young's modulus (GPa) | Melting point (° C.) | Tg (° C.) | Degree of crystallinity (%) | H1 | H2 | H2/H1 |
|---|---|---|---|---|---|---|---|---|---|
| Example | | | | | | | | | |
| 1 | 1 | 1 | 3.4 | 81 | 42 | 28 | 29 | 0 | 0 |
| 2 | 2 | 1 | 2.7 | 80 | 42 | 8 | 11 | 0 | 0 |
| 3 | 3 | 1 | 3.4 | 80 | 42 | 27 | 28 | 0 | 0 |
| 4 | 4 | 2 | 3.0 | 79 | 30 | 25 | 26 | 0 | 0 |
| 5 | 5 | 3 | 3.8 | 83 | 50 | 23 | 21 | 0 | 0 |
| 6 | 6 | 4 | 2.4 | 105 | 28 | 15 | 25 | 0 | 0 |
| 7 | 7 | 5 | 2.6 | 76 | 34 | 9 | 16 | 0 | 0 |
| 8 | 8 | 6 | 3.6 | 106 | 38 | 24 | 18 | 0 | 0 |
| Comparative Example | | | | | | | | | |
| 1 | 9 | 7 | 1.3 | 65 | −62 | 52 | 95 | 75 | 0.79 |
| 2 | 10 | 8 | 1.3 | 74 | −57 | 49 | 129 | 110 | 0.85 |
| 3 | 11 | 9 | 3.7 | 210 | 37 | 28 | 65 | 64 | 0.98 |
| 4 | 12 | 10 | 3.6 | 210 | 37 | 28 | 68 | 64 | 0.94 |
| 5 | 13 | 11 | 4.4 | 235 | 65 | 39 | 43 | 39 | 0.91 |
| 6 | 14 | 12 | 3.2 | — | 42 | — | — | — | — |
| 7 | 15 | 13 | 3.0 | — | 30 | — | — | — | — |
| 8 | 16 | 14 | 4.5 | — | 73 | — | — | — | — |
| 9 | 17 | 15 | 3.3 | — | 58 | — | — | — | — |
| 10 | 18 | 16 | 3.2 | — | 56 | — | — | — | — |
| 11 | 19 | 17 | 3.1 | — | 56 | — | — | — | — |

| | Toner | Resin | Crystalline property | Evaluation 1 of blocking property (sieve) | Low-temperature fixability | Development durability | Evaluation 2 of blocking property |
|---|---|---|---|---|---|---|---|
| Example | | | | | | | |
| 1 | 1 | 1 | Yes | A | A | B | A |
| 2 | 2 | 1 | Yes | A | A | B | B |
| 3 | 3 | 1 | Yes | A | A | A | A |
| 4 | 4 | 2 | Yes | A | A | B | A |
| 5 | 5 | 3 | Yes | A | B | A | A |
| 6 | 6 | 4 | Yes | A | B | C | A |
| 7 | 7 | 5 | Yes | A | A | C | B |
| 8 | 8 | 6 | Yes | A | B | B | A |
| Comparative Example | | | | | | | |
| 1 | 9 | 7 | Yes | A | A | D | A |
| 2 | 10 | 8 | Yes | A | A | D | A |
| 3 | 11 | 9 | Yes | A | C | A | A |

TABLE 2-continued

| | | | | | | | | |
|---|---|---|---|---|---|---|---|---|
| 4 | 12 | 10 | Yes | A | C | A | A | |
| 5 | 13 | 11 | Yes | A | C | A | A | |
| 6 | 14 | 12 | No | B | A | B | C | |
| 7 | 15 | 13 | No | B | A | C | C | |
| 8 | 16 | 14 | No | A | C | A | A | |
| 9 | 17 | 15 | No | B | A | B | C | |
| 10 | 18 | 16 | No | B | A | B | C | |
| 11 | 19 | 17 | No | B | A | B | C | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-081253, filed on Apr. 9, 2013, which is hereby incorporated by reference herein in its entirety.

The invention claimed is:

1. A crystalline polyester resin, comprising a condensation polymerization product of:
   (i) a dicarboxylic acid component containing at least one compound selected from the group consisting of terephthalic acid and terephthalic acid derivatives; and
   (ii) a diol component containing at least one compound selected from the group consisting of 2-methyl-1,3-propanediol and derivatives of 2-methyl-1,3-propanediol,
   said crystalline polyester resin having a weight-average molecular weight as measured by gel permeation chromatography of 5000 to 50000, and
   a Young's modulus as measured by an ultramicro durometer at 25° C. of at least 2 GPa and a melting point of 60° C. to 125° C.

2. The crystalline polyester resin according to claim 1, which has a glass transition temperature of 25° C. to 70° C.

3. The crystalline polyester resin according to claim 1, which has a degree of crystallinity as measured by wide-angle X-ray diffraction of at least 10%.

4. The crystalline polyester resin according to claim 1, which has a melting point of 60° C. to 100° C.

5. The crystalline polyester resin according to claim 1, which has an amount of heat of fusion, as measured by a differential scanning calorimeter, fulfilling H2/H1≤0.1
   wherein H1 (J/g) is an amount of heat of fusion during a first heating from 25° C. to 200° C. with a rate of 10° C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

6. A toner comprising a crystalline polyester resin, the crystalline polyester resin for toner, having a Young's modulus as measured by an ultramicro durometer at 25° C. of at least 2 GPa and a melting point of 60° C. to 125° C.

7. A method for producing toner comprising a crystalline polyester resin, the crystalline polyester resin, having a Young's modulus as measured by an ultramicro durometer at 25° C. of at least 2 GPa and a melting point of 60° C. to 125° C., the method comprising:
   a resin dissolution step of dissolving a polyester resin in an organic solvent to obtain a resin composition,
   the polyester resin being obtained by condensation polymerization of a dicarboxylic acid component containing at least one compound selected from the group consisting of terephthalic acid and terephthalic acid derivatives, and a diol component containing at least one compound selected from the group consisting of 2-methyl-1,3-propanediol and derivatives of 2-methyl-1,3-propanediol, and having a weight-average molecular weight as measured by gel permeation chromatography of at least 5000 and not more than 50000;
   a granulating step of dispersing the resulting resin composition in an aqueous medium to obtain a dispersion; and
   a solvent removal step of removing the organic solvent from the resulting dispersion.

8. The method for producing the toner according to claim 7, wherein the aqueous medium is maintained at 60° C. to 100° C. in the granulating step, and
   after the granulating step and before the solvent removal step, or in the solvent removal step, the aqueous medium is cooled with a cooling rate of 1° C./hr to 50° C./hr.

9. The method for producing the toner according to claim 7, wherein the aqueous medium contains a monovalent metal salt at 1% to 30% by mass.

10. The method for producing the toner according to claim 7, wherein the organic solvent contains at least an organic solvent A and an organic solvent B and fulfils the following conditions (1) and (2):
    (1) the crystalline polyester resin precipitates when it is dissolved in the organic solvent A at a concentration of 70% by mass and allowed to stand at 25° C. for 24 hours; and
    (2) the crystalline polyester resin does not precipitate when it is dissolved in the organic solvent B at a concentration of 70% by mass and allowed to stand at 25° C. for 24 hours.

11. The crystalline polyester resin according to claim 2, which has a degree of crystallinity as measured by wide-angle X-ray diffraction of at least 10%.

12. The crystalline polyester resin according to claim 2, which has a melting point of 60° C. to 100° C.

13. The crystalline polyester resin according to claim 11, which has a melting point of 60° C. to 100° C.

14. The crystalline polyester resin according to claim 2, which has an amount of heat of fusion, as measured by a differential scanning calorimeter, fulfilling H2/H1≤0.1
    wherein H1 (J/g) is an amount of heat of fusion during a first heating from 25° C. to 200° C. with a rate of 10° C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

15. The crystalline polyester resin according to claim 3, which has an amount of heat of fusion, as measured by a differential scanning calorimeter, fulfilling H2/H1≤0.1
    wherein H1 (J/g) is an amount of heat of fusion during a first heating from 25° C. to 200° C. with a rate of 10°

C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

16. The crystalline polyester resin according to claim 4, which has an amount of heat of fusion, as measured by a differential scanning calorimeter, fulfilling H2/H1≤0.1
wherein H1 (J/g) is an amount of heat of fusion during a first heating from 25° C. to 200° C. with a rate of 10° C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

17. The crystalline polyester resin according to claim 11, which has an amount of heat of fusion, as measured by a differential scanning calorimeter, fulfilling H2/H1≤0.1
wherein H1 (J/g) is an amount of heat of fusion during a first heating from 25° C. to 200° C. with a rate of 10° C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

18. The crystalline polyester resin according to claim 12, which has an amount of heat of fusion, as measured by a differential scanning calorimeter, fulfilling H2/H1≤0.1
wherein H1 (J/g) is an amount of heat of fusion during a first heating from 25° C. to 200° C. with a rate of 10° C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

19. The crystalline polyester resin according to claim 13, which has an amount of heat of fusion, as measured by a differential scanning calorimeter, fulfilling H2/H1≤0.1
wherein H1 (J/g) is an amount of heat of fusion during a first heating from 25° C. to 200° C. with a rate of 10° C./min; and H2 (J/g) is an amount of heat of fusion during a second heating, after cooling to 25° C. with a rate of 1° C./min after the first heating and maintenance at 25° C. for 24 hours, from 25° C. to 200° C. with a rate of 10° C./min.

* * * * *